United States Patent
Krattiger et al.

(10) Patent No.: US 11,985,063 B2
(45) Date of Patent: May 14, 2024

(54) SEAMLESS COEXISTENCE OF HETEROGENOUS NETWORKS

(71) Applicant: Cisco Technology, Inc., San Jose, CA (US)

(72) Inventors: Lukas Krattiger, Pleasanton, CA (US); Shyam Kapadia, San Jose, CA (US); Massimiliano Ardica, Valbonne (FR); Shankar Gopalkrishnan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/816,341

(22) Filed: Jul. 29, 2022

(65) Prior Publication Data
US 2023/0421498 A1    Dec. 28, 2023

(30) Foreign Application Priority Data
Jun. 28, 2022 (IN) .............................. 202241036888

(51) Int. Cl.
*H04L 45/745* (2022.01)
*H04L 45/00* (2022.01)
*H04L 61/103* (2022.01)

(52) U.S. Cl.
CPC ............ *H04L 45/745* (2013.01); *H04L 45/22* (2013.01); *H04L 61/103* (2013.01)

(58) Field of Classification Search
CPC ...... H04L 45/745; H04L 45/22; H04L 61/103
(Continued)

(56) References Cited

U.S. PATENT DOCUMENTS

2014/0064148 A1*  3/2014  Jain .................. H04L 12/28
                                                                         370/255
2014/0215079 A1    7/2014  Penno et al.
(Continued)

FOREIGN PATENT DOCUMENTS

WO     2012006190 A1    1/2012

OTHER PUBLICATIONS

Mishra et al., "Default Selective Multicast Route to Handle Heterogeneous Network Design," tdcommons.org, Mar. 6, 2019, pp. 1-6.
(Continued)

*Primary Examiner* — Sibte H Bukhari
(74) *Attorney, Agent, or Firm* — Polsinelli P.C.

(57) ABSTRACT

Disclosed are systems, apparatuses, methods, and computer-readable media for providing interoperable heterogenous networks. A method comprises configuring a logical network with a first network and a second network; receiving a request message from a source device by the first border device in the first network, wherein the request message includes a related to a media access control (MAC) address associated with a destination device in the second network; sending a proxy message to the second border device based on the request message, the proxy message having a source address that identifies an external IP address associated with the first border device; receiving a response message including the MAC address of the destination device, wherein the response message is addressed to the external address of the first border device; and sending a border gateway protocol (BGP) update including the MAC address of the destination device.

18 Claims, 10 Drawing Sheets

(58) Field of Classification Search
USPC .......................................................... 709/238
See application file for complete search history.

(56) References Cited

U.S. PATENT DOCUMENTS

| | | |
|---|---|---|
| 2016/0014025 A1 | 1/2016 | Wang |
| 2018/0309685 A1 | 10/2018 | Srinivasan et al. |
| 2019/0081925 A1* | 3/2019 | Gottlieb .................. H04L 45/02 |
| 2020/0021521 A1 | 1/2020 | Boutros et al. |
| 2021/0360040 A1 | 11/2021 | Abdelmalek et al. |
| 2022/0029915 A1 | 1/2022 | Moreno et al. |

OTHER PUBLICATIONS

International Search Report and Written Opinion for International Application No. PCT/US2023/069251, dated Oct. 13, 2023, 13 Pages.

\* cited by examiner

SEAMLESS COEXISTENCE OF HETEROGENOUS NETWORKS

CROSS-REFERENCE TO RELATED APPLICATIONS

This application claims the benefit of priority to Indian Provisional Patent Application No. 202241036888, filed Jun. 28, 2022, and entitled "SEAMLESS COEXISTENCE OF HETEROGENOUS," the disclosure of which is herein incorporated by reference in its entirety.

TECHNICAL FIELD

The present disclosure generally relates to the field of computer networking, and more particularly to seamless coexistence of heterogenous networks.

DESCRIPTION OF THE RELATED TECHNOLOGY

A virtual extensible local area network (VXLAN) is a network virtualization technology that attempts to ameliorate the scalability problems associated with legacy networks. Legacy networks implement a centralized gateway that creates network traffics bottlenecks, which is a particular problem for datacenter deployments. VXLAN uses a virtual local area network (VLAN)-like encapsulation technique to encapsulate media access control (MAC)-based open system interconnection (OSI) layer 2 Ethernet frames within layer 4 user datagram protocol (UDP) packets, using 4789 as the default Internet assigned number authority (IANA)-assigned destination UDP port number. VXLAN is an evolution of efforts to standardize on an overlay encapsulation protocol, increases scalability up to 16 million logical networks, and allows for layer 2 adjacency across Internet protocol (IP) networks. Multicast or unicast with Head-End Replication (HER) is used to flood broadcast, unknown destination address, multicast (BUM) traffic.

A large number of legacy network deployments still exist because the legacy networks are not interoperable with modern VXLAN overlays. Conventional approaches to migrating from a legacy network to modern architectures require taking the legacy network offline to migrate to modern networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
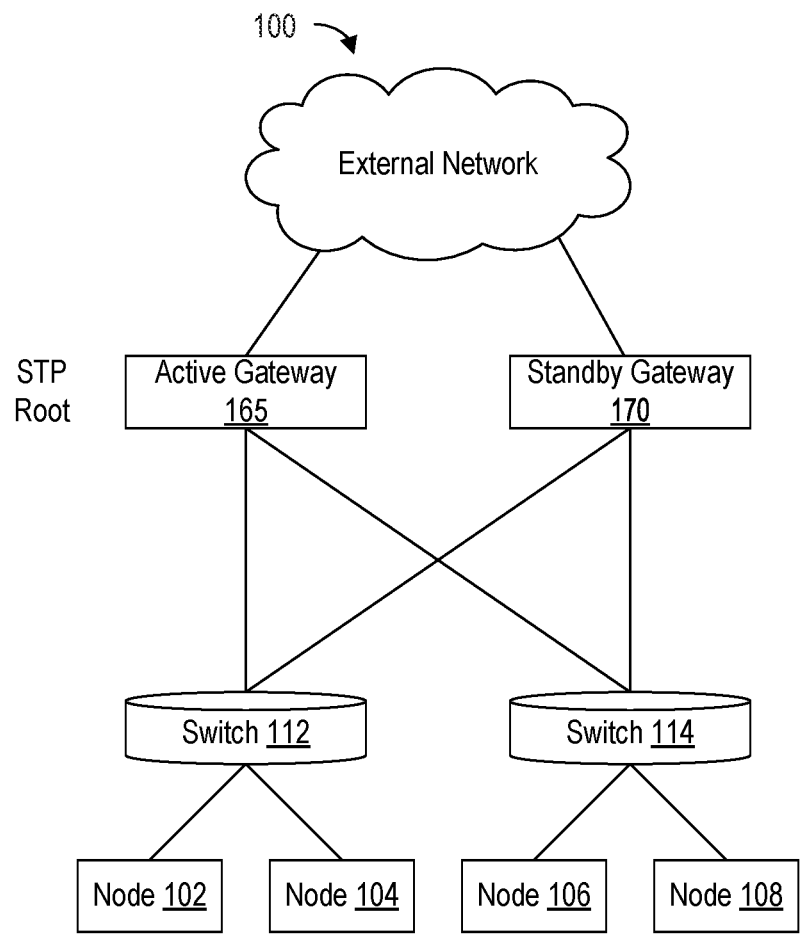
FIG. 1 illustrates a network 100 that implements a legacy Ethernet-based layer 2 deployment with centralized gateway configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In some examples, systems and techniques are described for implementing seamless heterogenous networks. Disclosed are systems, apparatuses, methods, and computer-readable media for device function. According to at least one example, a method is provided. The method includes: configuring a logical network with a first network and a second network, wherein the first network and the second network are interconnected via a first border device in the first network and a second border device in the second network; receiving a request message at the first border device in the first network, wherein the request message is related to a media access control (MAC) address associated with a destination device in the second network; sending a proxy message to the destination device based on the request message; receiving a response message including the MAC address of the destination device, wherein the response message is addressed to the external address of the first border device; and sending a border gateway protocol (BGP) update including the MAC address and an IP address of the destination device.

In another example, an apparatus for device function is provided that includes at least one memory and at least one processor coupled to the at least one memory. The at least one processor is configured to: receive a request message at the first border device in the first network, wherein the request message is related to a MAC address associated with a destination device in the second network; send a proxy message to the destination device based on the request message; receive a response message including the MAC address of the destination device, wherein the response message is addressed to the external address of the first border device; and send a BGP update including the MAC address and an IP address of the destination device.

In some aspects, the request message is received by the first border device using a default IP address that is different from the external IP address and includes a source IP address of a gateway of the source device. In some aspects, the request message is based on one of an address resolution protocol (ARP) request and an ARP refresh associated with the source device.

In some aspects, the source device does not receive a response to the request message, and the BGP update causes the source device to receive the MAC address of the destination device.

In some aspects, the request message includes a source MAC address of an anycast gateway and the proxy message comprises a MAC address associated with a virtual device context (VDC) of the first border device.

In some aspects, the second network includes a centralized gateway and implements with a redundancy protocol to fallback to a standby passive gateway when the centralized gateway becomes unavailable.

In some aspects, the proxy message is sent in lieu of the request message and the external IP address prevents the response message from being consumed by the centralized gateway.

In some aspects, the source device in the first network sends a packet to the destination device in the second network can after learning the MAC address of the destination device.

In some examples, systems and techniques are described for implementing seamless heterogenous networks. Disclosed are systems, apparatuses, methods, and computer-readable media for device function. According to at least one example, a method is provided and includes: configuring a virtual local area network (LAN) with a first network and a second network, wherein the first network and the second network are interconnected via a first border device in the first network and a second border device in the second network; receiving a request message from a source device in the second network by the first border device in the first network, wherein the request message is related to a MAC address associated with a destination device in the first network; in response to the request message, flooding the request message in the first network, wherein a leaf within the first network receives the request message and the destination device responds to the request message with an response that is addressed to the second border device and identifies a MAC address and an IP address of the destination device.

In another example, an apparatus is provided that includes at least one memory and at least one processor coupled to the at least one memory. The at least one processor is configured to: receive a request message from a source device in a second network by the first border device in the first network, wherein the request message is related to a MAC address associated with a destination device in the first network; in response to the request message, flood the request message in the first network, wherein a leaf within the first network receives the request message and the destination device responds to the request message with an response that is addressed to the second border device and identifies a MAC address and an IP address of the destination device.

Example Embodiments

In an IP network, every node in the network needs a default gateway to transmit traffic that leaves the subnet. The default gateway is deployed in a redundant manner by having a redundant gateway in standby. In the event the active gateway becomes unavailable, a redundancy protocol detects that the default gateway becomes inactive and configures a redundant standby gateway to take over. In more modern networks, there is a different approach referred to as anycast gateway or distributed anycast gateway that brings gateway functionality closer to the nodes in the network. An anycast gateway configuration is sometimes referred to as an active network because there is no protocol involved for standby and nodes in the IP network can be mobile, which requires the leaf switches to proactively monitor nodes. In a network that supports anycast, a leaf (e.g., a network switch) serves as the default gateway for the nodes connected to that leaf.

The modern networks and legacy networks behave differently and the mechanisms for configuring a node to communicate are different. For example, the ARP tables are in the modern network and the ARP tables in the legacy network are refreshed in different manners which creates challenges to support a network with co-existing support for both the legacy network operation and modern network operation. An illustrative example of a co-existence issue is an ARP or a neighbor discovery (ND) request for glean resolution because a gateway of the legacy network and a gateway of the modern network use the same MAC/IP address to ensure node mobility within the network. When an ARP request is transmitted from a node in the modern network to a node in a legacy network, the ARP response is consumed by the gateway of the legacy network and causes the ARP resolution to fail because both gateways use the same MAC address.

Interoperation of the modern networks and legacy networks has not been possible without taking at least a portion of the network offline to change the network configuration. One example mitigation strategy is to keep the default gateway for the extended subnets active only on one infrastructure (e.g., the legacy network) at any given point in time, which typically results in inefficient traffic across those networks. The migration of the default gateway function from the legacy network to the modern networks requires sequentially taking the gateway in the legacy network offline and bringing the gateway of the modern network online. This migration strategy is not ideal because the migration is not seamless and disrupts traffic.

The present technology allows the interoperation of modern network and legacy network without changes to the legacy network configuration. In particular, the present technology describes configuring a border leaf (BL) anycast gateway with an interface and additional functionality and enables the BL anycast gateway to interoperate with legacy network configurations. The present technology thereby enables a seamless transition from the legacy network configuration to the more scalable approach of the modern networks without taking the legacy network offline. Customers and network operators can seamlessly transition from the legacy network configuration to the modern network configuration without incurring any downtime and ensure that the network is not functionally inhibited.

Figure 2:
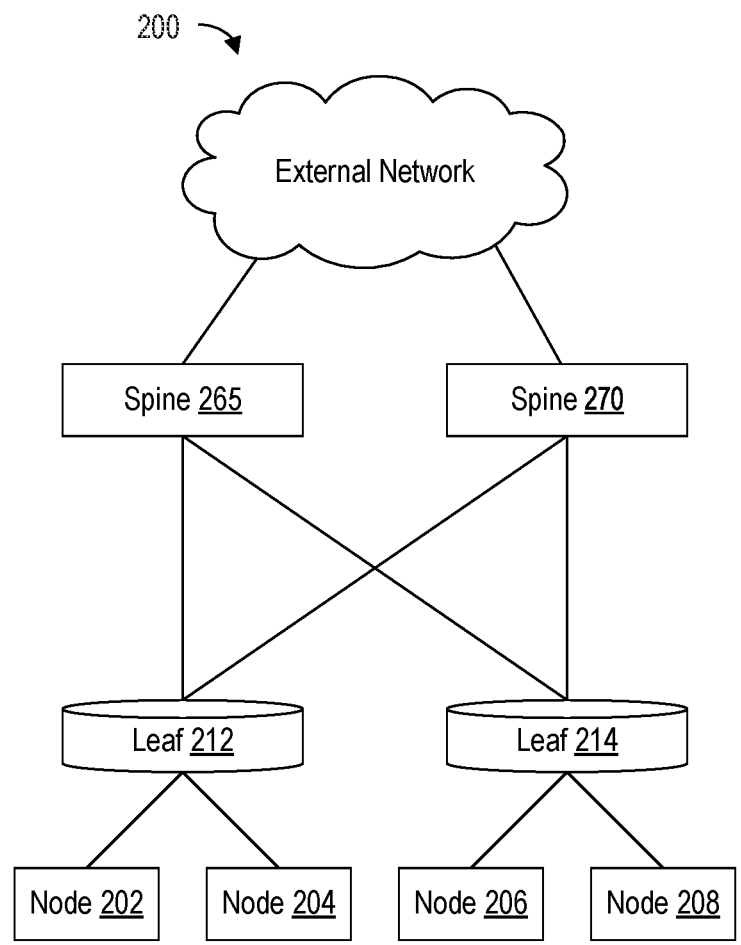
FIG. 2 illustrates an example network that uses a distributed gateway configuration in accordance with some examples.
Figure 3A:
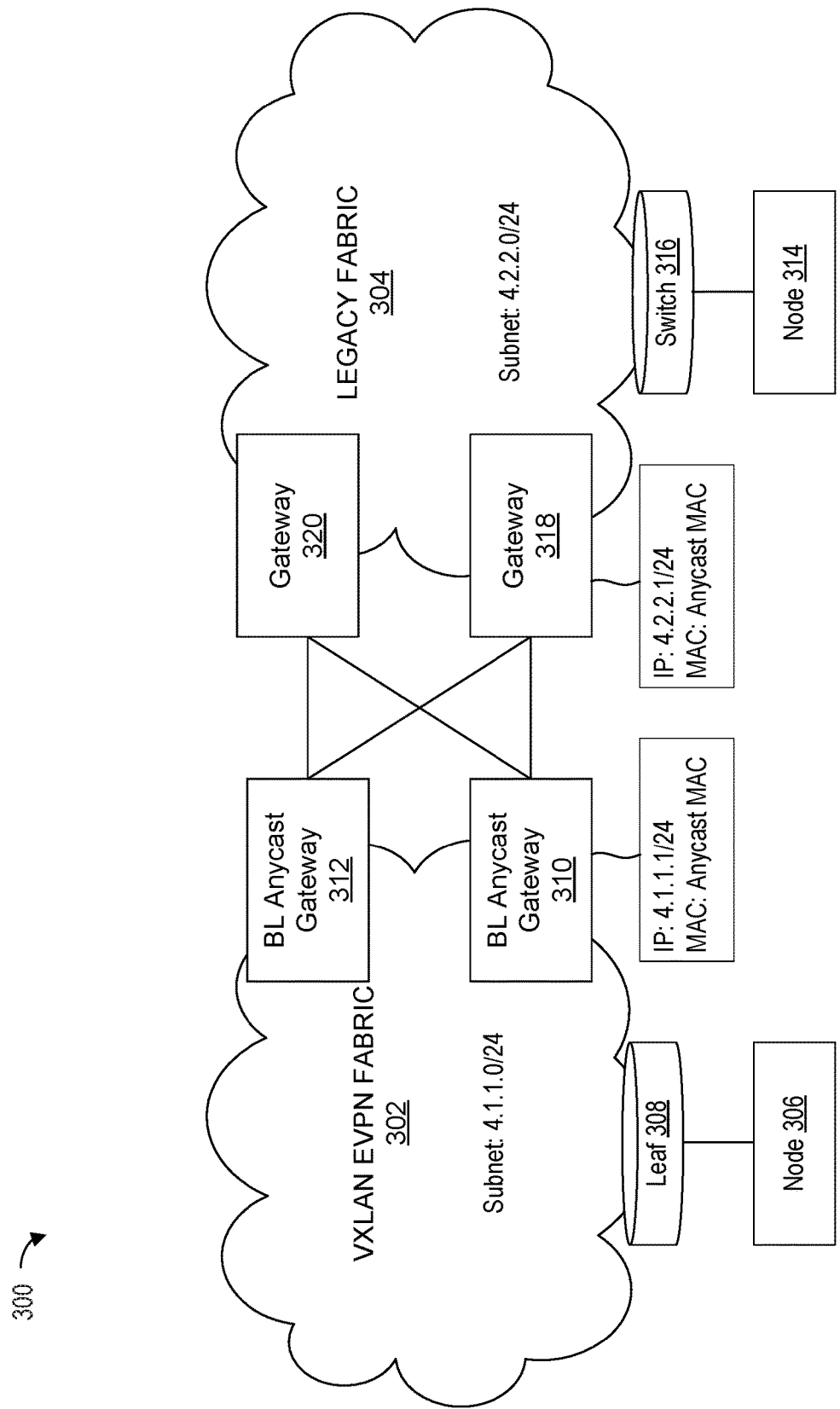
FIGS. 3A and 3B illustrate various heterogenous co-existing networks in accordance with some aspects of the disclosure.
Figure 3B:
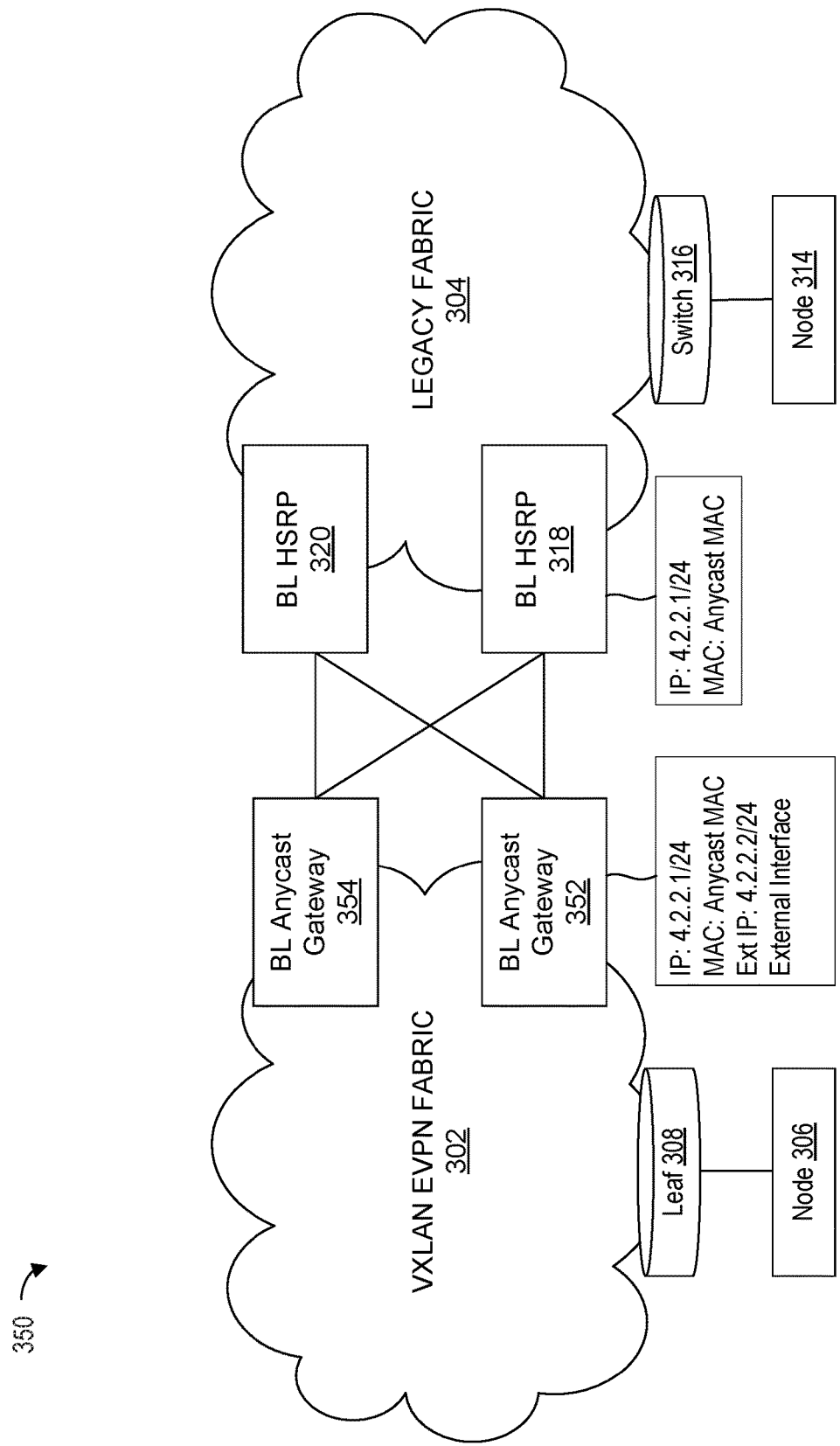
Figure 4:
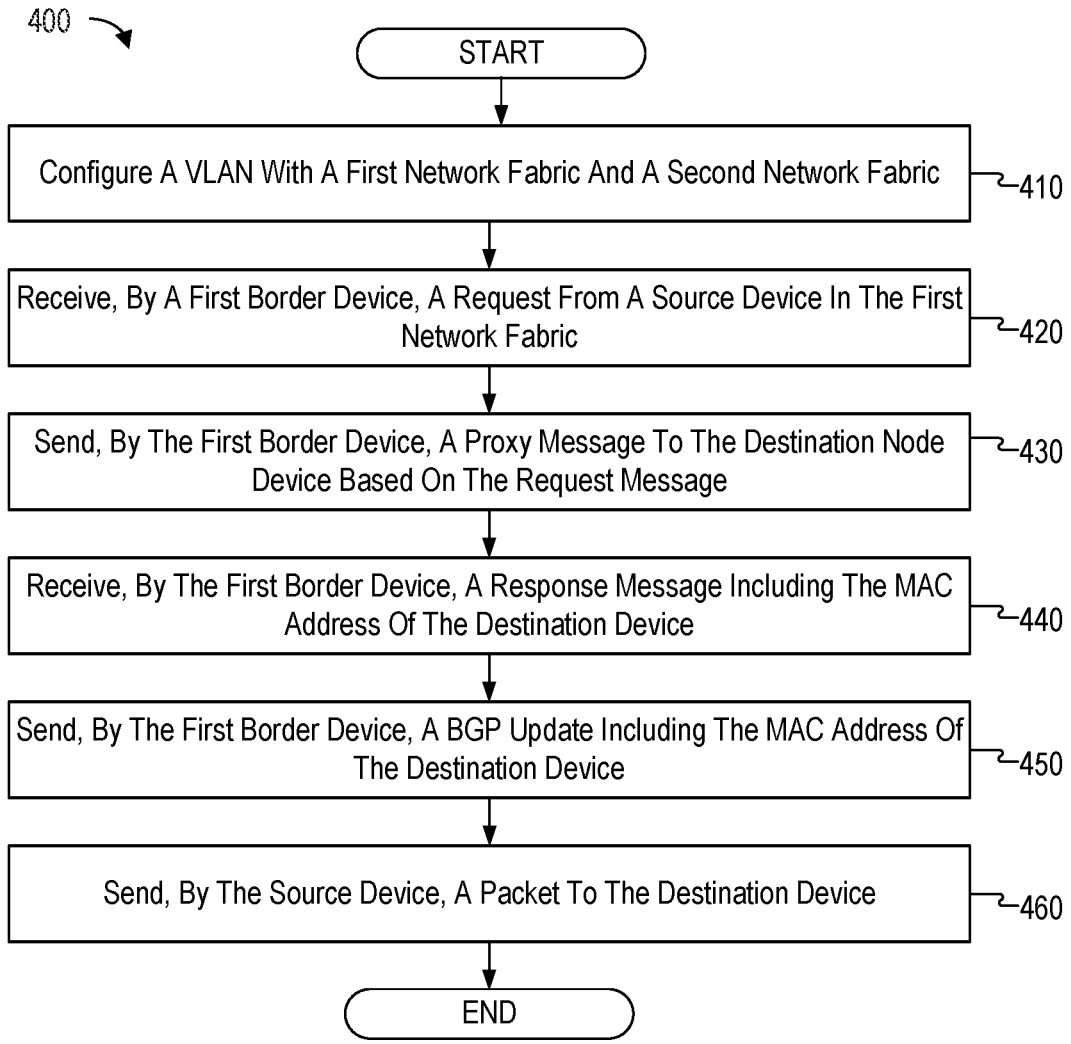
FIG. 4 illustrates an example method for sending messages between heterogenous co-existing networks without modifications to a legacy network, in accordance with some aspects of the disclosure.
Figure 5:
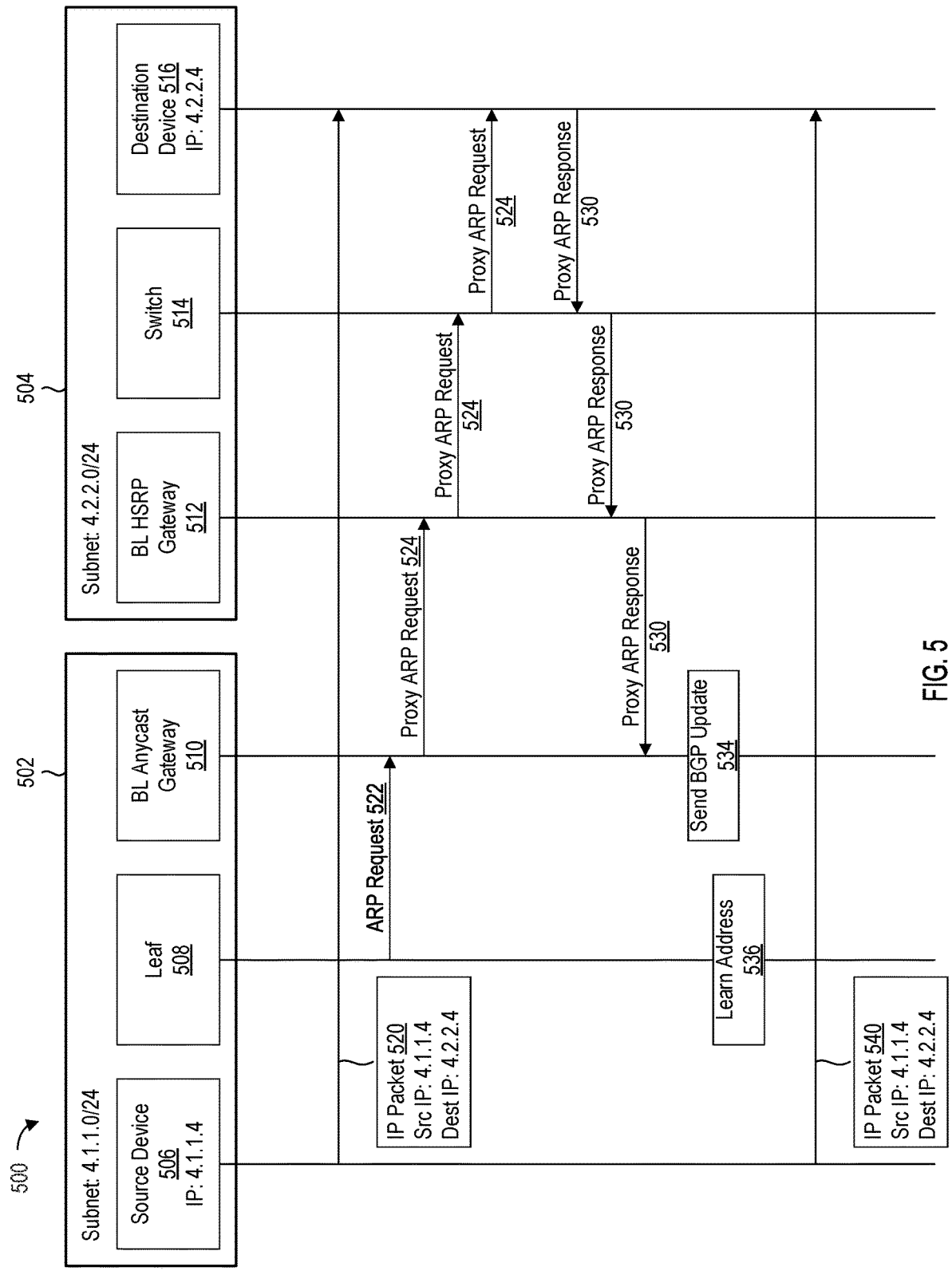
FIG. 5 illustrates a sequence diagram for configuring a source device in a modern network for communicating with a destination device in a legacy network in accordance with some aspect of the disclosure.
Figure 6:
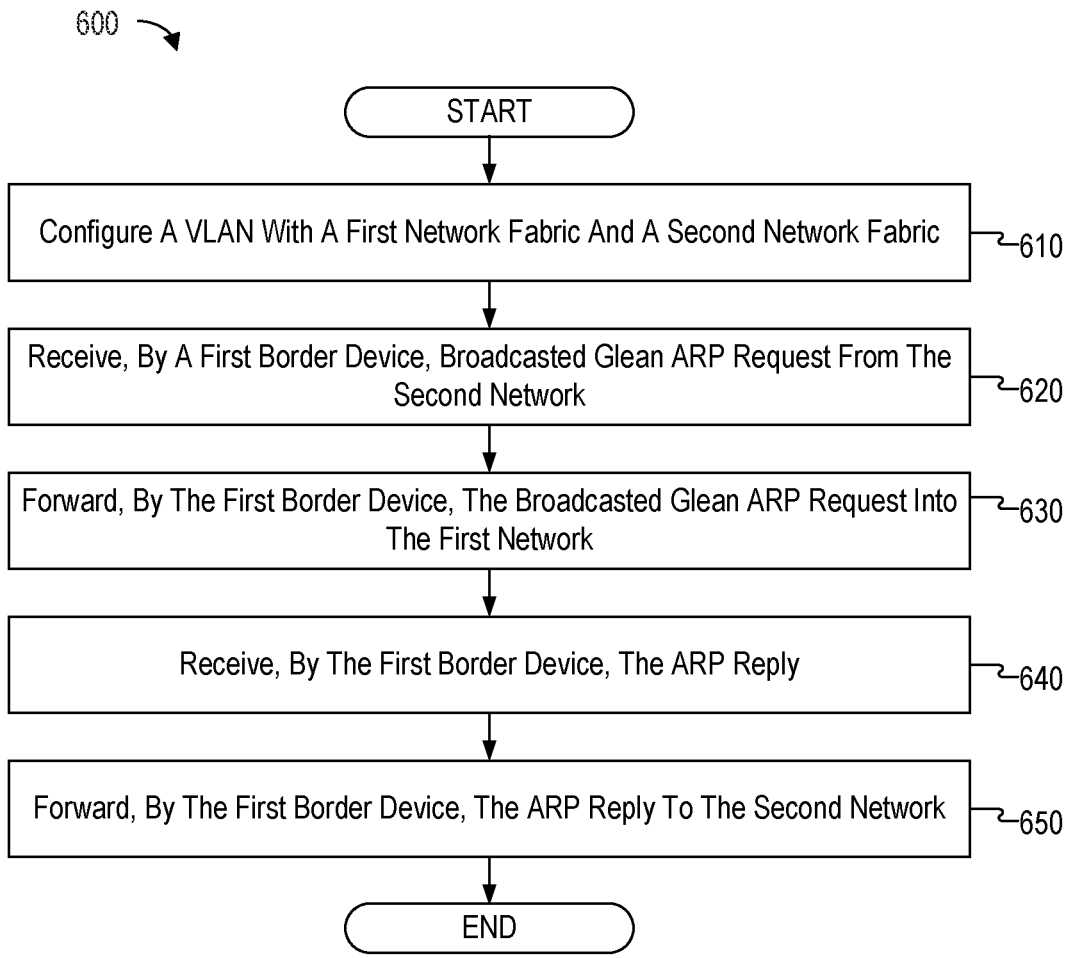
FIG. 6 illustrates another example method for sending messages between heterogenous co-existing networks without modifications to a legacy network, in accordance with some aspects of the disclosure.
Figure 7:
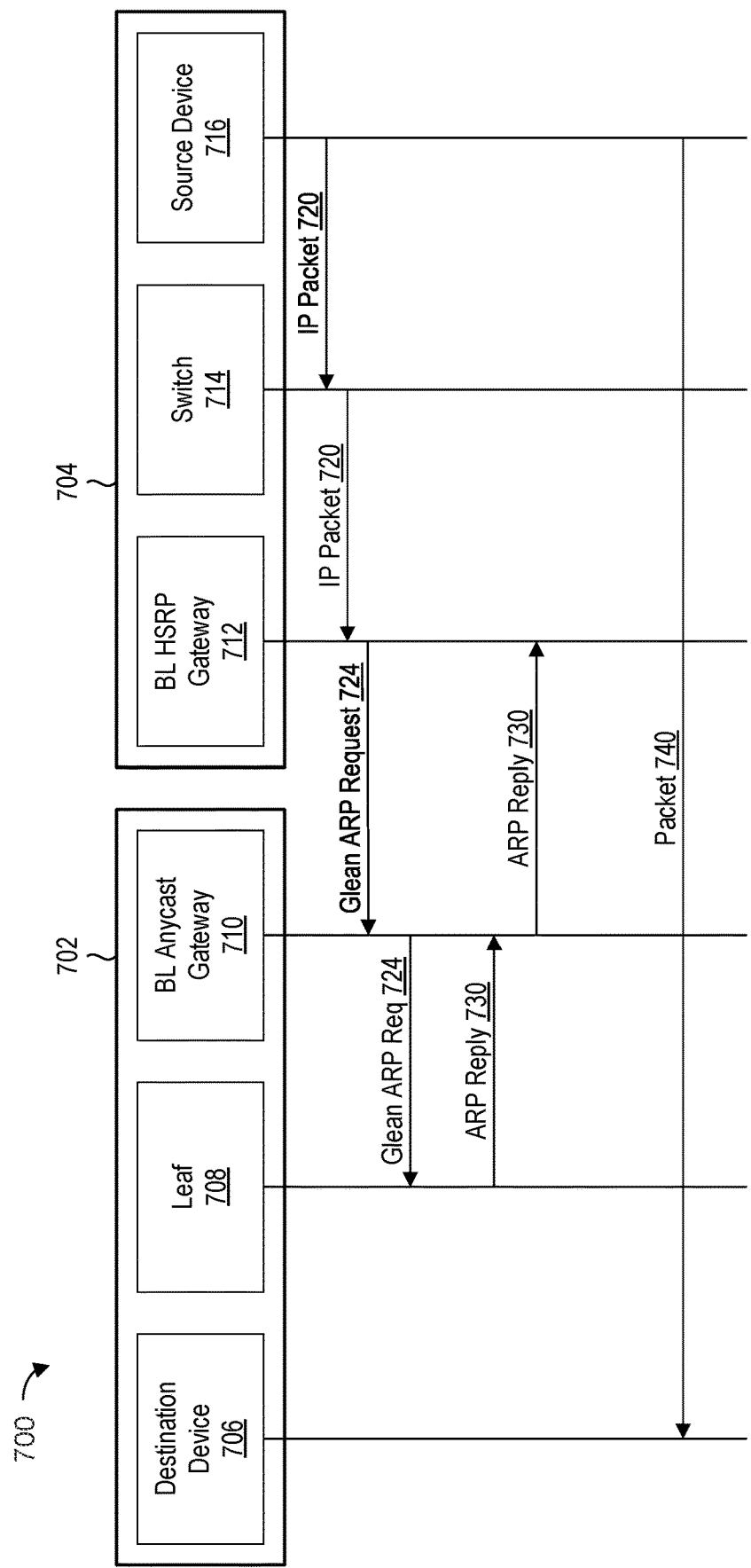
FIG. 7 illustrates a sequence diagram for configuring a source device in a legacy network for communicating with a destination device in a modern network in accordance with some aspects of the disclosure.
Figure 8:
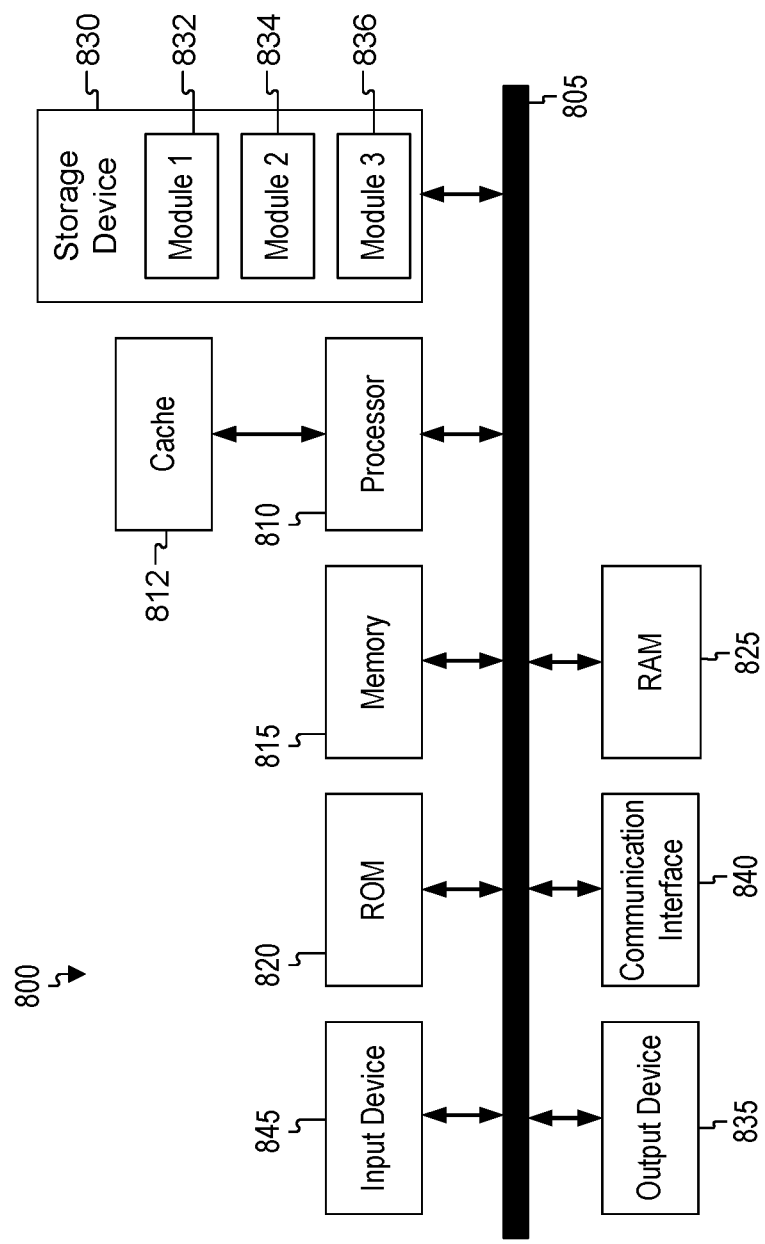
FIG. 8 shows an example of computing system, which can be for example any computing device that can implement components of the system.
Figure 9:
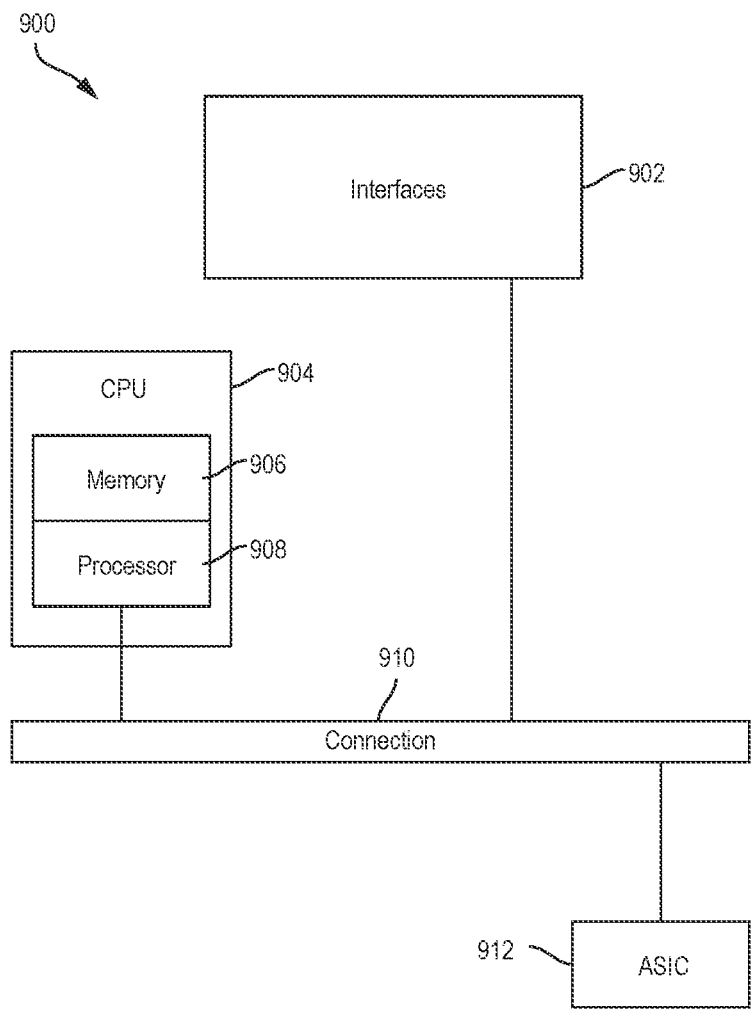
FIG. 9 illustrates an example network device in accordance with some examples of the disclosure.

FIG. 1 illustrates a legacy network that uses a first hop redundancy protocol (FHRP) with a centralized gateway, and FIG. 2 illustrates a modern network that uses an anycast gateway. FIGS. 3A and 3B illustrate heterogeneous co-existing networks in accordance with some aspects of the disclosure. FIG. 4 illustrates an example method for sending messages between heterogenous co-existing networks, and FIG. 5 is a sequence diagram that corresponds to the example method in FIG. 4. FIG. 6 illustrates another example method for sending messages between heterogenous co-existing networks, and FIG. 7 is a sequence diagram that corresponds to the example method in FIG. 6. The discussion then concludes with a brief description of example devices, as illustrated in FIGS. 8 and 9. These variations shall be described herein as the various embodiments are set forth. The disclosure now turns to FIG. 1.

FIG. 1 shows a network 100 that implements a legacy Ethernet-based layer 2 deployment with a centralized gateway configuration. As shown in FIG. 1, the network 100 may comprise nodes 102, 104, 106, and 108, which are connected to a corresponding access switch. Node 102 and node 104 are connected to access switch 112 and node 106 and node 108 are connected to access switch 112. The nodes 102, 104, 106, and 108 are examples and can be any suitable logical or physical device, such as a physical server, or can be logical devices such as a virtual local area network (VLAN).

The access switch 112 and the access switch 114 are connected to an active gateway 165, which is the default gateway for the nodes 102, 104, 106, and 108, and a standby gateway 170. In one aspect, a FHRP, such as Hot Standby Router Protocol (HSRP) and Virtual Router Redundancy Protocol (VRRP), may be implemented to achieve layer 3 redundancy. For example, a standby gateway 170 may also be connected to the access switch 112 and the access switch 114. When the active gateway 165 becomes unavailable, the HSRP activates the standby gateway to serve as the default gateway for the nodes. The network 100 may implement Spanning Tree Protocol (STP) to provide loop protection and provide layer 2/layer 3 demarcations.

The network 100 is constrained based on the gateway configuration because all traffic that leaves the subnet is resolved through the centralized controller (e.g., the active gateway 165 or the standby gateway 170 when the active gateway 165 is unavailable). For example, any traffic between VLANs within the network 100 must be routed through the active gateway irrespective of whether the VLANs are within the same switch. More modern active networks are instead moving to different methods for reaching the same objective such as an anycast gateway configuration that distributes gateway functions.

FIG. 2 illustrates an example network 200 that uses a distributed gateway configuration in accordance with some examples. In some aspects, FIG. 2 illustrates a spine-and-leaf configuration of a Virtual Extensible Local Area Network (VXLAN), which is a scheme of layer 2 overlay on top of layer 3. A VXLAN encapsulates Ethernet frames with a VXLAN header and uses user datagram protocol (UDP) in IP for transport. The VXLAN header contains a VXLAN segment identifier (ID) or VXLAN network identifier (VNI), which is a 24-bit field to identify virtual network segments for different tenants. VXLAN tunnel endpoint (VTEP) is a software or hardware component that performs actual VXLAN encapsulation and decapsulation. A VXLAN segment is enabled on a VTEP only when a user configures its VNI under the logical interface of the VTEP.

In the spine-and-leaf configuration each leaf (e.g., a lower-tier switch such as leaf 212 and the leaf 214) is connected to each of the spines (e.g., a top-tier switch such as spine 265 and spine 270) in a full-mesh topology. The leaf layer consists of access switches that connect to devices such as servers. For example, as illustrated in the network 200, each leaf 212 and 214 are interconnected with each spine 265 and 270. The spine layer is the backbone of the network and is responsible for interconnecting all leaf switches. Every leaf switch connects to every spine switch in the network. The path is randomly chosen so that the traffic load is evenly distributed among the top-tier switches. If one of the top-tier switches were to fail, it would only slightly degrade performance throughout the data center.

With a spine-and-leaf configuration, no matter which leaf switch to which a server is connected, its traffic crosses the same number of devices to get to another server, unless the other server is located on the same leaf. For example, because gateway functionality is distributed to the leaf 212 and the leaf 214 (rather than a central controller in FIG. 1), traffic between the node 202 and node 204 is isolated within the leaf 212 even when the two nodes belong to different IP subnets.

The network 200 configuration keeps latency at a predictable level because a payload only has to hop to a spine switch and another leaf switch to reach its destination. This configuration has several advantages such as scaling network capacity and increased node mobility. While spine-and-leaf architecture for VXLAN-Ethernet virtual private network (EVPN) networks has become the standard for new deployments, many legacy networks as illustrated in FIG. 1 still exist and customers are gradually transitioning to the distributed anycast gateway configuration.

FIG. 3A illustrates an example heterogenous co-existing network. For example, the network 300 is a VLAN than horizontally scales across multiple devices and encompasses a VXLAN-EVPN network 302 and a legacy network 304 that uses a centralized gateway with a FHRP BL gateway. In some examples, the VXLAN-EVPN network 302 and the legacy network 304 are stretched across the two sites and associated with two different IP subnets, with the VXLAN-EVPN network 302 having an IP subnet of 4.1.1.0/24 and the legacy network 304 having an IP subnet of 4.2.2.0/24. In this example, a default gateway for both subnets is concurrently installed on leaf 308, BL anycast gateways 310 and 312 of the VXLAN-EVPN network 302, and the HSRP nodes (e.g., gateways 318 and 320) of the legacy network 304. The VXLAN-EVPN network 302 includes a node 306 that is connected to a leaf 308 and the node 306 is associated with subnet 4.1.1.0/24, and the leaf 308 is the anycast gateway for the node 306 to communicate with various devices in the legacy network 304. The legacy network 304 includes a node 314 connected to a switch 316, which is configured to use an active gateway, such as BL HSRP gateway 318 or BL HSRP gateway 320, to communicate with the VXLAN-EVPN network 302. The node 314 is associated with subnet 4.2.2.0/24.

In this configuration, the network 300 can suffer due to inefficient network traffic or improper traffic configuration between the VXLAN-EVPN network 302 and the legacy network 304. An example issue is when an ARP or an ND request (e.g. for glean resolution) originates from a node 314 in the legacy network 304. For example, the node 314 attempts to transmit a packet to the node 306, and the packet is received by the node 314. The node 314 sends an ARP request to retrieve the MAC address of its default gateway, which is deployed on the HSRP gateway 318, and then originates an IP packet destined to node 306. When the HSRP gateway 318 receives the IP packet, and assuming that the destination subnet (4.1.1.0/24) for node 306 is locally instantiated, the HSRP gateway 318 would generate an ARP glean request for discovering the MAC address of node 306. The ARP request will be delivered to node 306 and a response to the ARP request will be provided to the HSRP gateway 318 because the source MAC address for the ARP glean is the HSRP gateway 318. In this network configuration, a consistent First-Hop gateway MAC/IP address is required for host mobility and seamless migration and the legacy network needs to align the MAC address of the FHRP gateway with a MAC address of the BL anycast gateway MAC, which is a pre-requirement for supporting seamless endpoint migration/mobility between the two networks with different architectures in heterogenous network.

The ARP response or ND response from the node 314 is consumed by the BL HSRP gateway 318 or BL HSRP gateway 320 because the BL HSRP gateway 318 or BL HSRP gateway 320 uses the same address as the BL anycast gateway 310 or 312. As a result, the gateways of the VXLAN-EVPN network 302 do not receive a response to the ARP request or the ND request and the node 314 does not receive the MAC address of the node 306.

To avoid these types of interoperability issues, migration strategies are normally conducted by keeping the default gateway for the extended subnets active only on one infrastructure (legacy gateway or anycast gateway) at any given point in time, which typically results in inefficient movement of traffic across those networks. The migration of the default gateway function from the legacy network to the distributed anycast gateway can only be active on one given side (e.g., the VXLAN-EVPN network 302 or the legacy network 304) at any given point in time. If the default gateway and the distributed anycast gateway are both active, traffic can be hair-pinned, which is when traffic that leaves on an interface is returned to that same interface. Migration is therefore not seamless and requires a disruption in network traffic because the gateway function on one network is first be disabled and the gateway function is then enabled on the other network.

FIG. 3B illustrates an example of a heterogeneous co-existing network 350 in accordance with some aspects of the disclosure. In some aspects, the VXLAN-EVPN network 302 any leaf in the (e.g., leaf 308, BL anycast gateway 352 and BL anycast gateway 354) may be configured with an anycast gateway function, and the BL anycast gateway 352 and BL anycast gateway 354 are configured to interface with legacy network 304 by creating an external interface and modifying some behaviors. As will be described below, the legacy network 304 does not require any special treatment or modifications to the gateways.

The modifications to enable the co-existence of the legacy network 304 require the BL anycast gateway 352 or the BL anycast gateway 354 to perform additional operations that prevent network flooding, duplicate responses, and failed network address resolutions, for example. In one illustrative aspect, the BL anycast gateway 352 is configured to receive inter-network messages and proxy various operations of the BL anycast gateway 352 to enable seamless co-existence of different networks.

For example, when an ARP request destined to an endpoint in the legacy network and originated from a leaf node (e.g., leaf 308) in the VXLAN-EVPN network 302 is received by the BL anycast gateway 352, the BL anycast gateway 352 is configured to filter the ARP request message and, in place of the original ARP request message, send a proxy ARP request message using the external interface of the BL anycast gateway 352. For example, the BL anycast gateway 352 can send a proxy ARP request message utilizing an additional source MAC and IP addresses of the BL anycast gateway 352, which is referred to as an external address and is unique to the BL anycast gateway 352. By sending the proxy ARP request message with the external address (e.g., a MAC address and an IP address), a response to the proxy ARP request message is received by the BL anycast gateway 352. The source MAC address of this proxy ARP request is the switch MAC of gateway 352 and allows the response from node 314 to get back to gateway 352. While the original ARP request from the leaf 308 will time out because the ARP response is not provided to the leaf 308, the BL anycast gateway 352 will send a BGP update message including the MAC address and the IP address of the node 314, to induce other devices, such as the leaf 308, to learn the IP and MAC addresses and update MAC and IP address bindings.

In another illustrative aspect, the BL anycast gateways 352 and 354 are configured to intercept and drop inter-network messages (e.g., ARP and gratuitous APR (GARP) messages) that originate from the legacy network 304 or from a leaf internal to the VXLAN-EVPN network 302 and send a proxy message with a source MAC address that identifies the anycast gateway MAC. For example, when the node 314 requires a MAC address of the node 306 and sends an ARP request that is broadcasted to the BL anycast gateway 352, the BL anycast gateway 352 may filter the ARP request and send a proxy ARP request with a source address that corresponds to the IP address of the BL anycast gateway 352. The BL anycast gateway may receive the response and send a BGP update to cause the devices in the network 300 to learn the MAC address of the node 314.

In some aspects, when a virtual port channel (VPC) is configured as an external interface of the BL anycast gateway 352 to connect to the legacy network 304, the BL anycast gateway 352 is configured with additional behavior to enable interaction with the legacy network 304. In an illustrative aspect, an access control list or other control mechanism is configured on the external interface of the BL anycast gateway 352 to drop any ingress HSRP hello message from the legacy network 304 to preclude learning the anycast gateway MAC address, which is used as the source of HSRP messages generated form the BL HSRP gateway. The BL anycast gateway 352 can also be configured to drop inter-network messages such as gratuitous ARP (GARP) or ARP requests that include the source MAC address that corresponds to the source MAC address of the anycast gateway to avoid learning the MAC address. For egress traffic, the BL anycast gateways 352 and 354 are configured to intercept and drop inter-network message (e.g., ARP and gratuitous APR (GARP) messages) that originate from the legacy network 304 or from a leaf internal to the VXLAN-EVPN network 302 and send a proxy message with a source MAC address that identifies the anycast gateway MAC As noted above, the external interface is configured with a switched virtual interface (SVI) external IP address configured with the same subnet IP (e.g., 4.1.1.2/24) that is unique and may include a mask of the anycast gateway (e.g., 4.1.1.1/24). The external IP and MAC binding should happen with the virtual device context (VDC) MAC of the switch, and a notification can be generated to ensure that mapping and translation entries are learned by the nodes and applications within the network 350. Further details and examples are further described herein with reference to FIGS. 4 to 7.

FIG. 4 illustrates an example method 400 for sending messages between heterogenous co-existing networks, in accordance with some aspects of the disclosure. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes configuring a VLAN with a first network and a second network at block 410. For example, the second network can be a legacy network with a centralized controller, such as a Cisco® FabricPath, that serves as the default gateway, and may implement with a redundancy protocol to fallback to a standby passive gateway when the centralized gateway becomes unavailable. Illustrative examples of a redundancy protocol include HSRP and VRRP. The first network can be a modern configuration such as a VXLAN-EVPN network.

The VXLAN-EVPN network and the legacy network are interconnected via a first border device in the VXLAN-EVPN network and a second border device in the legacy network. As will be described further, the network devices within the legacy network do not require any special configuration to enable seamless migration to the VXLAN-EVPN network.

According to some examples, a first border device in the VXLAN-EVPN network may receive a request message from a source device in the VXLAN-EVPN at block 420. The request message may be related to a MAC address associated with a destination device in the legacy network and can include, for example, an ARP request, an ND request, and an ARP refresh. In one illustrative example, a node connected to the source device may transmit an IP packet that is received by the source device, which includes an anycast gateway function, and the source device may transmit an ARP request to resolve the MAC address of the destination device. The request message is received by the first border device using a default interface and may include a source IP address of a leaf of the source device. The request message received by the first border device includes a source MAC address of an anycast gateway. In some aspects, the proxy message includes a source MAC address that identifies a VDC of the first border device.

Because the first border device filters the request, the source device does not receive a response to the request and the request message will timeout. However, as further described below, the source device will learn of the MAC address and the IP address of the destination device based on a BGP update as further illustrated and described with reference to block 450.

According to some examples, the first border device can filter the request message (e.g., drop the request message) and send a proxy message, which is based on the request message, to the destination device in lieu of the request message at block 430. The proxy message includes an external IP address and a switch MAC address that is unique to the first border device and prevents an ARP response message from being locally consumed by the second border device.

According to some examples, the first border device may receive a response message including the MAC address of the destination device at block 440. According to some aspects, the response message is addressed to the switch MAC address of the border device because the proxy message identifies the source IP address as the external IP address of the first border device. For example, the first border device will receive responses to the proxy request and isolate the response message without passing the message into the VXLAN-EVPN network.

According to some examples, the first border device may send a BGP update including the MAC and IP addresses of the destination device at block 450. In some aspects, the BGP update causes devices within the network, including the source device, to learn the MAC and IP addresses of the destination device. At block 460, the source device in the first network learns of the MAC and IP addresses of the destination device and then sends a packet to the destination device in the legacy network.

In some aspects, the first border device self-proxies requests from the VXLAN-EVPN network based on using the external IP address and switch MAC address to be able to receive the ARP response from the destination device in the legacy network. In addition, this configuration does not require any additional configuration or modification of the legacy network. Seamless interoperation of the VXLAN-EVPN network and legacy network significantly improves migration and does not require any offline modifications.

FIG. 5 illustrates a sequence diagram 500 for configuring a source device 506 in a VXLAN-EVPN network 502 for communicating with a destination device 516 in a legacy network 504 in accordance with some aspects of the disclosure. In one example, the source device 506 may desire to send a packet to the destination device 516 and lookup the MAC address of the destination device 516 in an ARP cache on the source device 506. Based on the ARP cache not having the MAC address of the destination device 516, the source device 506 sends an IP packet 520 to a leaf 508 to request the MAC address of the destination device 516. Table 1 below illustrates example aspects of the IP packet 520 and identifies the source IP address of the source device 506 and a destination IP address of the destination device 516. The destination MAC address of the IP packet 520 identifies the MAC address of the anycast gateway associated with the network and deployed on leaf 508.

TABLE 1

Packet

{
   sourceIp: 4.1.1.4,
   sourceMac: Node306MacAddress,
   destinationIP: 4.2.2.4,
   destinationMac: Leaf508AnycastMacAddress
}

The leaf 508 receives the IP packet 520 and broadcasts a glean ARP request 522 targeted to the IP address of the destination device 516. Leaf 508 will generate an ARP Glean 522 sourced with the anycast gateway MAC and this packet is broadcasted internally to the VXLAN-EVPN network 502 and reaches the BL anycast gateway. An example of the broadcasted ARP Glean 522 is further described in Table 2 below.

TABLE 2

ARP Glean

{
   sourceIp: 4.2.2.1,
   sourceMac: AnycastGatewayMac,
   destinationIP: 4.2.2.4,
   destinationMac: FF:FF:FF:FF:FF:FF
}

BL anycast gateway 510 is elected as a designated forwarder for broadcast traffic in VXLAN-EVPN network 502 and is responsible for handling the received ARP request. The BL anycast gateway 510 receives the broadcasted ARP request 522 and is configured to drop the ARP request and generate a modified ARP request to guarantee a response by self-proxying some messages between the VXLAN-EVPN network 502 and the legacy network 504. For example, the BL anycast gateway 510 generates and sends a proxy ARP request 524 with a source address that corresponds to the IP address of the BL anycast gateway 510 and a MAC address that corresponds to the switch MAC address to the legacy network 504. An example of the proxy ARP request 524 is illustrated in Table 3 below.

TABLE 3

Proxy ARP

{
   sourceIp: 4.2.2.2,
   sourceMac: VDCMacAddress,
   destinationIP: 4.2.2.4,
   destinationMac: FF:FF:FF:FF:FF:FF
}

The source IP address of the proxy ARP request 524 identifies the external IP address of the BL anycast gateway 510 (e.g., 4.2.2.2) to guarantee a response is provided to the BL anycast gateway 510. The default gateway address associated with the VLAN interface in the VXLAN-EVPN network 502 and the legacy network 504 is 4.2.2.1, and BL HSRP gateway 512 within the VXLAN-EVPN network 502 can consume the ARP response and prevent the MAC address from the destination device 516 from being provided to the BL anycast gateway.

The BL HSRP gateway 512 receives the proxy ARP request 524 and forwards the proxy ARP request 524 to a switch 514 associated with the destination device 516, which then forwards the proxy ARP request 524 to the destination device 516. The destination device 516 responds to the proxy ARP request 524 with a proxy ARP response 530 that includes the MAC address of the destination device 516. The proxy ARP response 530 will be addressed to the external address (e.g., the destination MAC address) of the BL anycast gateway 510.

In response to receiving the proxy ARP response 532, the BL anycast gateway 510 is configured to consume the proxy ARP response 530 and send a BGP update to devices within the VXLAN-EVPN network 502 to learn the MAC and IP addresses of the destination device 516 at block 534. Devices in the VXLAN-EVPN network 502 inject the MAC and IP addresses into their Layer 2 routing information base (RIB) and forwarding information base (FIB) along with their associated adjacent devices.

Based on the BL anycast gateway 510 sending the BGP update, the leaf 508 is configured to learn the MAC and IP addresses of the destination device 516 at block 536. The leaf 508 stores the MAC and IP addresses of the destination device 516 in its forwarding tables and allows the source device 506 to send a packet 540 to the destination device 516.

Although the example illustrated in FIG. 5 is related to ARP resolution, the example method can be used in other types of messages, such as an ARP refresh for IPv4 networks, and an ND request in IPv6 networks, for example.

FIG. 6 illustrates another example method 600 for sending messages between heterogenous co-existing networks that can coexist without modifications to a legacy network, in accordance with some aspects of the disclosure. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes configuring a VLAN with a first network and a second network at block 610. As described above in connection with FIG. 4, the first network can be a VXLAN-EVPN network and the second network can be a legacy network (e.g., Cisco FabricPath). The identified networks are examples and the first network and the second network can be any different network technology.

According to some examples, a source device in the legacy network may transmit a packet to a destination device in the VXLAN-EVPN network, which are in different subnets. The source device will ARP resolve the MAC address of its default gateway and will then send an IP packet to the BL HSRP gateway. The BL HSRP gateway will then generate a glean ARP request targeted to the endpoint in the VXLAN EVPN network. This broadcast glean ARP request is sourced from the unique switch MAC address of the BL HSRP gateway. At block 620, a first border device (e.g., BL anycast gateway 352) may receive a broadcasted glean ARP request message related to a MAC address associated with a destination device in the VXLAN-EVPN network. For example, the request message can be an ARP request, an ND message, an ARP refresh, or another type of message.

According to some examples, the first border device may forward the received broadcast request into the VXLAN-EVPN network at block 630. The broadcast ARP request includes a source address associated with the originating BL HSRP gateway and it is flooded inside the VXLAN-EVPN network, reaching also the destination device inside the VXLAN-EVPN network.

The first border device may receive an ARP reply message from a leaf associated with the destination device that includes the MAC address of the destination node at block 640. The ARP reply message is destined to the unique switch MAC address identifying the HSRP BL gateway, and the first border device forwards this packet toward the legacy network at block 650.

In some aspects, the HSRP BL gateway device in the legacy network learns of the MAC address of the destination device and then sends a packet addressed to the destination device.

FIG. 7 illustrates a sequence diagram 700 for configuring a source device 716 in a legacy network 704 for communicating with a destination device 706 in a VXLAN-EVPN network 702 in accordance with some aspects of the disclosure. In one example, the source device 716 transmits an IP packet 720 to a switch 714 that the source device 716 is connected to. The switch 714 receives the request and transmits the IP packet 720 to the BL HSRP gateway 712 of the legacy network 704, which then generates and broadcasts a glean ARP request 724 targeted to the destination device 706. The broadcast ARP request 724 is generated with the unique switch MAC identifying the BL HSRP gateway.

To complete the ARP request, the BL anycast gateway 710 floods the received broadcast ARP request 724 inside the VXLAN-EVPN network 702. The ARP request is eventually received by the destination device 706, which responds with a unicast ARP reply addressed to the switch MAC of the BL HSRP gateway 712. The ARP reply 730 is received by the BL anycast gateway 710 and forwarded toward the legacy network 704. The BL anycast gateway receives the ARP response and learns the MAC address of the destination device in the VXLAN-EVPN network 702. This allows the source device 716 to successfully establish IP communication with the destination device 706 and send a packet 740 across the different subnets.

FIG. 8 shows an example of computing system 800, which can be for example any computing device making up the various roles described above (e.g., source device 506, leaf 508, BL anycast gateway 510, BL HSRP gateway 512, switch 514, destination device 516, destination device 706, source device 716) or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, asynchronous transfer mode (ATM) interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the bus 910, to exchange data and signals and coordinate various types of operations by the network device 900, such as routing, switching, and/or data storage operations, for example.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method, comprising: configuring a logical network with a first network and a second network, wherein the first network and the second network are interconnected via a first border device in the first network and a second border device in the second network; receiving a request message at the first border device in the first network, wherein the request message is related to a media access control (MAC) address associated with a destination device in the second network; sending a proxy message to the destination device based on the request message, the proxy message having a source address that identifies an external address associated with the first border device; receiving a response message including the MAC address of the destination device, wherein the response message is addressed to the external address of the first border device; sending a border gateway protocol (BGP) update including the MAC address and an IP address of the destination device.

Aspect 2. The method of Aspect 1, wherein the request message is received by the first border device using a default IP address that is different from the external IP address and includes a source IP address of a gateway of the source device.

Aspect 3. The method of any of Aspects 1 to 2, wherein the request message is based on one of an address resolution protocol (ARP) request and an ARP refresh associated with the source device.

Aspect 4. The method of any of Aspects 1 to 3, wherein the source device does not receive a response to the request message, and wherein the BGP update causes the source device to receive the MAC address and the IP address of the destination device.

Aspect 5. The method of any of Aspects 1 to 4, wherein the request message includes a source MAC address of an anycast gateway and the proxy message comprises a MAC address associated with a virtual device context (VDC) of the first border device.

Aspect 6. The method of any of Aspects 1 to 5, wherein the second network includes a centralized gateway.

Aspect 7. The method of any of Aspects 1 to 6, wherein the second network implements with a redundancy protocol to fallback to a standby passive gateway when the centralized gateway becomes unavailable.

Aspect 8. The method of any of Aspects 1 to 7, wherein the external IP address prevents the response message from being consumed by the centralized gateway.

Aspect 9. The method of any of Aspects 1 to 8, wherein the proxy message is sent in lieu of the request message.

Aspect 10. The method of any of Aspects 1 to 9, wherein the source device in the first network sends a packet to the destination device in the second network after learning the MAC address of the destination device.

Aspect 11. A non-transitory computer readable medium comprising instructions, the instructions, when executed by a computing system, cause the computing system to: receive a request message at the network device in a first network, wherein the request message is a related to a request to retrieve a media access control (MAC) address associated with a destination device in a second network, and wherein the first network and the second network are interconnected via the network device and a second border device in the second network; send a proxy message to the destination device based on the request message, the proxy message having a source address that identifies an external address associated with the first border device; receive a response message including the MAC address of the destination device, wherein the response message is addressed to the external address of the first border device; and send a border gateway protocol (BGP) update including the MAC address and an IP address of the destination device.

Aspect 12. The non-transitory computer readable medium of Aspect 11, wherein the request message is received by the first border device using a default IP address that is different from the external IP address and includes a source IP address of a gateway of the source device.

Aspect 13. The non-transitory computer readable medium of any of Aspects 11 to 12, wherein the request message is based on one of an address resolution protocol (ARP) request and an ARP refresh associated with the source device.

Aspect 14. The non-transitory computer readable medium of any of Aspects 11 to 13, wherein the source device does not receive a response to the request message, and wherein the BGP update causes the source device to receive the MAC address and the IP address of the destination device.

Aspect 15. The non-transitory computer readable medium of any of Aspects 11 to 14, wherein the request message includes a source MAC address of an anycast gateway and the proxy message comprises a MAC address associated with a virtual device context (VDC) of the first border device.

Aspect 16. The non-transitory computer readable medium of any of Aspects 11 to wherein the second network includes a centralized gateway, wherein the second network implements with a redundancy protocol to fallback to a standby passive gateway when the centralized gateway becomes unavailable, and wherein the external IP address prevents the response message being consumed by the centralized gateway.

Aspect 17. A network device comprising: a storage configured to store instructions; and a processor configured to execute the instructions and cause the processor to: receive a request message at the network device in a first network, wherein the request message is a related to a request to retrieve a media access control (MAC) address associated with a destination device in a second network, and wherein the first network and the second network are interconnected via the network device and a second border device in the second network; send a proxy message to the destination device based on the request message; receive a response message including the MAC address of the destination device, wherein the response message is addressed to the external address of the first border device; and send a border gateway protocol (BGP) update including the MAC address and an IP address of the destination device.

Aspect 18. The network device of Aspect 17, wherein the request message is received by the first border device using a default IP address that is different from the external IP address and includes a source IP address of a gateway of the source device.

Aspect 19. The network device of any of Aspects 17 to 18, wherein the request message is based on one of an address resolution protocol (ARP) request and an ARP refresh associated with the source device.

Aspect 20. The network device of any of Aspects 17 to 19, wherein the source device does not receive a response to the request message, and wherein the BGP update causes the source device to receive the MAC address and the IP address of the destination device.

What is claimed is:

1. A method, comprising:
   configuring a logical network with a first network and a second network, wherein the first network and the second network are interconnected via a first border device in the first network and a second border device in the second network;
   receiving a request message at the first border device in the first network, wherein the request message is related to a media access control (MAC) address associated with a destination device in the second network;
   sending, in response to receiving the request message, a proxy message to the destination device based on the request message, the proxy message having a source address that identifies an external address associated with the first border device;
   receiving, in response to sending the proxy message, a response message including the MAC address of the destination device, wherein the response message is addressed to the external address of the first border device;
   sending, in response to receiving the response message, a border gateway protocol (BGP) update including the MAC address and an IP address of the destination device;
   wherein the second network includes a centralized gateway;
   wherein the second network implements with a redundancy protocol to fallback to a standby passive gateway when the centralized gateway becomes unavailable.

2. The method of claim 1, wherein the request message is received by the first border device using a default IP address that is different from the external IP address and includes a source IP address of a gateway of the source device.

3. The method of claim 2, wherein the request message is based on one of an address resolution protocol (ARP) request and an ARP refresh associated with the source device.

4. The method of claim 2, wherein the source device does not receive a response to the request message, and wherein the BGP update causes the source device to receive the MAC address and the IP address of the destination device.

5. The method of claim 1, wherein the request message includes a source MAC address of an anycast gateway and the proxy message comprises a MAC address associated with a virtual device context (VDC) of the first border device.

6. The method of claim 1, wherein the external IP address prevents the response message from being consumed by the centralized gateway.

7. He method of claim 1, wherein the proxy message is sent in lieu of the request message.

8. The method of claim 1, wherein the source device in the first network sends a packet to the destination device in the second network after learning the MAC address of the destination device.

9. A non-transitory computer readable medium comprising instructions, the instructions, when executed by a computing system, cause the computing system to perform operations comprising:
- receive a request message at the network device in a first network, wherein the request message is a related to a request to retrieve a media access control (MAC) address associated with a destination device in a second network, and wherein the first network and the second network are interconnected via the network device and a second border device in the second network;
- send, in response to receiving the request message, a proxy message to the destination device based on the request message, the proxy message having a source address that identifies an external address associated with the first border device;
- receive, in response to sending the proxy message, a response message including the MAC address of the destination device, wherein the response message is addressed to the external address of the first border device; and
- send, in response to receiving the response message, a border gateway protocol (BGP) update including the MAC address and an IP address of the destination device;
- wherein the second network includes a centralized gateway;
- wherein the second network implements with a redundancy protocol to fallback to a standby passive gateway when the centralized gateway becomes unavailable.

10. The non-transitory computer readable medium of claim 9, wherein the request message is received by the first border device using a default IP address that is different from the external IP address and includes a source IP address of a gateway of the source device.

11. The non-transitory computer readable medium of claim 10, wherein the request message is based on one of an address resolution protocol (ARP) request and an ARP refresh associated with the source device.

12. The non-transitory computer readable medium of claim 10, wherein the source device does not receive a response to the request message, and wherein the BGP update causes the source device to receive the MAC address and the IP address of the destination device.

13. The non-transitory computer readable medium of claim 9, wherein the request message includes a source MAC address of an anycast gateway and the proxy message comprises a MAC address associated with a virtual device context (VDC) of the first border device.

14. The non-transitory computer readable medium of claim 9, wherein the external IP address prevents the response message being consumed by the centralized gateway.

15. A network device comprising:
- a storage configured to store instructions; and
- a processor configured to execute the instructions and cause the processor to perform operations comprising:
  - receive a request message at the network device in a first network, wherein the request message is a related to a request to retrieve a media access control (MAC) address associated with a destination device in a second network, and wherein the first network and the second network are interconnected via the network device and a second border device in the second network;
  - send, in response to receiving the request message, a proxy message to the destination device based on the request message;
  - receive, in response to sending the proxy message, a response message including the MAC address of the destination device, wherein the response message is addressed to the external address of the first border device; and
  - send, in response to receiving the response message, a border gateway protocol (BGP) update including the MAC address and an IP address of the destination device;
- wherein the second network includes a centralized gateway;
- wherein the second network implements with a redundancy protocol to fallback to a standby passive gateway when the centralized gateway becomes unavailable.

16. The network device of claim 15, wherein the request message is received by the first border device using a default IP address that is different from the external IP address and includes a source IP address of a gateway of the source device.

17. The network device of claim 16, wherein the request message is based on one of an address resolution protocol (ARP) request and an ARP refresh associated with the source device.

18. The network device of claim 16, wherein the source device does not receive a response to the request message, and wherein the BGP update causes the source device to receive the MAC address and the IP address of the destination device.

* * * * *